3,354,150
PROCESS FOR THE PRODUCTION OF STEROID BROMOHYDRINS OR CYCLIC ETHERS DERIVED THEREFROM
Derek Harold Richard Barton, London, England, assignor to Research Institute for Medicine and Chemistry, Inc., Cambridge, Mass., a corporation of Massachusetts
No Drawing. Filed May 10, 1965, Ser. No. 454,742
Claims priority, application Great Britain, May 15, 1964, 20,450/64
10 Claims. (Cl. 260—239.55)

ABSTRACT OF THE DISCLOSURE

A steroid bromohydrin containing the grouping

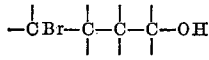

is produced by reacting a nitrite ester of a steroid alcohol containing the grouping

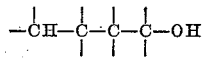

with free bromine radicals. The bromohydrin may be converted into a cyclic ether, either spontaneously or by treatment with a base.

---

This invention relates to a novel process for the production of bromohydrins and cyclic ethers derived therefrom.

In synthetic organic chemistry it is often required to introduce a cyclic ether grouping into a molecule, especially in the field of steroid or alkaloid synthesis. It is also useful to provide various types of bromohydrins in which the bromine atom and hydroxyl group are either conformationally adjacent or are able to become conformationally adjacent, since these can usually be converted into the desired cyclic ethers by removal of HBr or the bromine atom may be replaced by other substituents such as ether, thioether, amino groups, etc.

By the term "conformationally adjacent" atoms or groups is meant that these are so positioned that they may approach without appreciable molecular strain to within the distance normal for an interatomic bond. Thus, for example, in the steroids, a hydroxyl group in the 6β-position is conformationally adjacent to a hydrogen at the 19-position while a hydroxyl in the 1β-position is conformationally adjacent to a hydrogen at the 11β-position.

It will be seen that in the above examples the conformationally adjacent atoms or groups are separated by a chain of four intervening carbon atoms, thereby allowing the conformationally adjacent atoms or groups to form part of a six-membered structure which, as is well-known, is normally substantially free from strain. Naturally, where the intervening carbon atoms form part of a structure in which the bond rotation and movement is restricted, as in polycyclic structures such as steroids, the arrangement of all the bonds must allow the relevant atoms or groups to become adjacent.

It has been observed previously that when alcohols possessing a hydroxyl group conformationally adjacent to a hydrogen atom are reacted with iodine and lead tetraacetate, an oxide bridge is often formed between the carbon atoms carrying the said hydrogen and hydroxyl groups to produce a cyclic ether. It has also been suggested that a similar effect could be achieved by reacting the alcohol with a tertiary butyl hypohalite or with interhalogen compounds, cyanogen halides, N-halogenoamides, imides, etc.

In U.S. application No. 349,478, filed Mar. 4, 1964, and now Patent No. 3,290,296, there is described a process for the preparation of cyclic ethers or of iodohydrins having a conformationally adjacent iodine atom and hydroxyl group, wherein an alcohol possessing a carbon-attached hydrogen atom which is or is able to be conformationally adjacent to the alcoholic hydroxyl group is reacted with iodine and a hypochlorite, hypobromite or nitrite ester of a tertiary alcohol or is converted into a nitrite ester and reacted with iodine, whereby the said hydrogen atom is replaced by an iodine atom to form an iodohydrin which may be converted into a cyclic ether by elimination of hydrogen iodide.

It has now been found that it is possible to form bromohydrins rather than iodohydrins by reaction of a nitrite ester of an alcohol having a hydrogen atom conformationally adjacent to the hydroxyl group with a substance liberating free bromine radicals, for example molecular bromine, an N-bromoamide or imide, cyanogen bromide, etc., or, more especially, bromo-trichloromethane. Such bromohydrins readily dehydrobrominate to form cyclic ethers, often spontaneously.

According to the present invention, therefore, there is provided a process for the preparation of bromo-hydrins having a bromine atom conformationally adjacent to or able to become conformationally adjacent to a hydroxyl group or cyclic ethers derived therefrom wherein a nitrite ester of an alcohol possessing a carbon-attached hydrogen atom which is or is able to be conformationally adjacent to the alcoholic hydroxyl group is reacted with a substance liberating free bromine radicals, whereby the said carbon-attached hydrogen atom is replaced by a bromine atom to form a bromo-hydrin which may be converted into a cyclic ether by elimination of hydrogen bromide.

The new process according to the invention is thus able to introduce a bromine atom at a previously unsubstituted carbon atom and allows cyclic ethers to be prepared without requiring both the oxygen-linked carbon atoms to be substituted previously. The use of the alcohol in the form of its nitrite ester has the advantage that sensitive groupings, such as keto groups, present in the molecule need not be protected.

The reaction is effected by generation of free bromine radicals and the reaction conditions will depend on the nature of the bromine-containing reactant. In general, it is preferred that the reaction be carried out under ultraviolet radiation since this promotes liberation of free bromine radicals and also the reaction of the nitrite ester. Thus, for example, bromo-trichloromethane liberates bromine radicals on photolysis and where this compound is used, the reaction mixture may be irradiated with ultraviolet light of the wave-lengths causing the splitting of the carbon-bromine and nitrite bonds. In general, the wavelength of the ultraviolet light will be in the range 240 to 500 mµ and thus, for example, a mercury vapour lamp may be used as light source for such a photolysis. The reaction is preferably carried out in an inert solvent medium and in photolytic reactions the solvent chosen will be one which dissolves the reactants and does not significantly absorb radiation of the photolytic wavelength. Thus, for example, chlorinated hydrocarbon solvents such as carbon tetrachloride or hydrocarbon solvents such as benzene, toluene, etc. are useful in steroid synthesis since they dissolve many steroids and are not substantially opaque to the required radiation.

The bromohydrin may be converted into the corresponding cyclic ether by treatment with a base, e.g. an alkali or alkaline earth metal hydroxide, carbonate, etc., or an organic nitrogen base such as triethylamine, trimethylamine, pyridine, etc. One especially useful medium for dehydrobromination is potassium or sodium hydroxide in solution in an alkanol such as methanol or ethanol, e.g. at about 5% concentration.

In the general case it is not necessary for all the atoms intervening between the conformationally adjacent groups of the alcohol reactant to be carbon and in general it is possible for at least one intervening atom to be oxygen, nitrogen or sulphur, provided that the compound is chemically stable and that the atoms carrying the conformationally adjacent atoms or groups are both carbon. The process of the invention is thus of particular use in converting compounds having the grouping

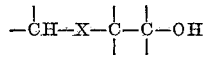

into bromohydrins having the grouping

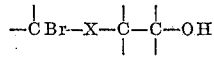

or the cyclic ethers containing the grouping

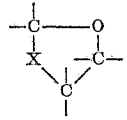

which may be formed therefrom, X being a methylene, methylidene, methylidyne or imino group or an oxygen, nitrogen or sulphur atom.

As indicated above, the reaction is especially useful in steroid synthesis and one particular application is the preparation of 6,19-ethers from 6-hydroxy steroids.

By the term "steroids" we mean compounds having the basic cyclopentanoperhydrophenanthrene ring structure and which may contain various substituents and/or double bonds, e.g. a keto, hydroxy or acyloxy group in the 3-position, alkyl groups in the 2-, 6- and 16-positions, keto, acetyl group etc. at the 20-position, keto groups, hydroxy and/or hydrocarbon or acyl (e.g. acetoxyacetyl) groups etc. at the 17-position, a hydroxy or keto group at the 11- or 12-position, a hydroxy group at the 6-position, a hydroxy group at the 21-position, a double bond at the 1- and/or 4 position, a halogen atom such as fluorine in the 11- or 6-position etc.

Steroid 6,19-ethers may be converted by reduction to give 19-hydroxy steroids, some of which are of use in medicine as anabolic, estrogenic, progestational and antifertility agents. Preferred 6β-hydroxy steroids are those having a group in the 3-position which may be converted into a keto group, e.g. a 3β-acyloxy group or a 3-ketal or thioketal group, and a β-eliminatable substituent, such as a halogen atom or a mesyloxy or tosyloxy group, in the 5α-position; such steriods may be converted into their 6,19-ethers by the present process and then converted to 3-ketones and caused to undergo β-elimination to yield 4,5-dehydro-3-keto-steroid 6,19-oxides. These may then be reductively cleaved with dissolving metal or low valency metal ion reducing agents, e.g. zinc and acetic acid, chromous chloride, aluminium amalgam etc. to yield 4,5-dehydro-3-keto-19-hydroxy steroids such as 19-hydroxy progesterone which is physiologically active as a progestational agent. Conversion to the 3-ketone may be effected by mineral acid hydrolysis in the case of the ketals and thioketals and in the case of 3-acyloxy groups by mineral acid hydrolysis followed by oxidation with a reagent serving to oxidise an alcohol to a ketone, for example chromium trioxide, e.g. in acetone. β-Elimination may be effected under acid conditions and may take place spontaneously during oxidation. Preferred groups in other positions in the steroid molecule include a fluorine, chlorine or bromine atom in the 9-position, a protected or unprotected keto group in the 11-position, a protected or unprotected keto, acyloxy, acetyl, β-acetyl-α-acyloxy or octyl group at the 17-position and/or an alkyl group in the 2-, 6- or 16-position.

Other conformationally adjacent positions in the steroid molecule include the 11- and 18-positions and the 20- and 18-positions.

The nitrite ester of the alcohol to be iodinated or cyclised may be prepared, for example, by the methods conventional in the art, for example by reaction with a nitrosylating agent such as a nitrosyl halide, e.g. nitrosyl chloride or bromide.

In order that the invention may be well understood we give the following examples by way of illustration only. All temperatures are in ° C.

Example 1.—Photolysis of 3β-acetoxycholestanyl-6β-nitrite with bromotrichloromethane Method.—To the above nitrite (1 mmole) in benzene (80 ml.) was added the appropriate amount of bromotrichloromethane and the solution irradiated with a 200 watt lamp using a Pyrex filter and externally cooling in an ice-water bath. After irradiation, the solution was washed with water, dried (Na2SO4), filtered and evaporated to dryness in vacuo. The residual gum was heated in refluxing 5% methanolic potassium acetate solution for four hours before again extracting with methylene chloride and drying. On evaporation, the residue was chromatographed through acid washed alumina (15 g.) using benzene and methylene chloride mixtures to elute. Generally, the nature of the reaction mixture and the chromatographic fractions were examined by thin-layer chromatography.

Results:

TABLE 1

| Run | Equivalents of Bromotrichloromethane | Percent 6β-ol | Percent 6-one | Percent 6,19 ether | Comments |
|---|---|---|---|---|---|
| 47 | 10 | 18 | Trace | 23 | Recrystallized. |
| 47 | 50 | 17 | Trace | 38 | Do. |
| 69 | 50 | 20 | 5 | 35 | Do. |
| 75 | 50 | 7 |  | [1] 45 | Ether only Recrystallized + NEt3 (4 equivalents). |

[1] Carried out for 30–40 minutes.

Example 2.—Photolysis of prednisolone bismethylenedioxide-11β-nitrite with bromotrichloromethane Method.—The photolysis was effected as in Example 1. Cyclisation of bromohydrin was carried out with a 5% methanolic solution of potassium hydroxide for one hour at reflux. Chromatography was on alumina (loading of ca. 40); elution was with methanolic-methylene chloride mixtures.

TABLE 2

| Run | Equivalents (IV) | Photolysis Time | Percent 11-one | Percent 11,18 ether | Percent 11,-ol | Remarks |
|---|---|---|---|---|---|---|
| 39 | 11 | 2¼ hrs | 6 | 10.5 | 12 | Not recrystallized. |
| 43 | 100 | 1½ hrs | 5 | 8 | 6 |  |
| 63 | 24 | 40 min |  | 11.2 | 12.7 | Recrystallized. |

*Example 3.—Androsta-1,4-dien-3,17-dione-11,18-oxide*

Androsta-1,4-diene - 3,17 - dione-11β-yl-nitrite (0.56 gm.) in benzene (80 ml.) and trichloro-bromo-methane (9 gm.) were irradiated for 40 min. at room temperature using a 200-watt lamp. The solvents were removed in vacuo at lower temperature. The crude product was treated with potassium acetate (0.5 gm.) in refluxing methanol (20 ml.) for one hour. After working-up as in Example 1, the desired product (110 mg., M.P. 168–172°) identical with an authentic specimen, was obtained by chromatography on alumina (25 gm.).

*Example 4.—18-bromo-androsta-1,4-dien-3,11,17-trione*

Androsta-1,4-dien-3,17-dion-11β-yl-nitrite (0.365 gm.) in benzene (75 ml.) and bromotrichloro-methane (6.0 gm.) were irradiated as in Example 3. The solvents were removed in vacuo. The crude product in acetone (15 ml.) was treated with Jones reagent (1.0 ml., 2 N). After 6 min. at room temperature the mixture was worked up as in Example 1. Chromatography on alumina (15 gm.) gave the desired bromo compound (78 mg.), M.P. 183–6° (dec.), $\alpha_D + 212°$, $$\lambda_{max.}^{MeOH} \; 239 \; m\mu \; (\epsilon = 17,200)$$

*Analysis.*—Calcd. for $C_{19}H_{21}BrO_3$: C, 60.58; H, 5.61; O, 12.72. Found: C, 60.72; H, 5.57; O, 12.54.

*Example 5.—18-bromo-prednisone acetate*

Prednisolone acetate-11β-yl-nitrite (3.0 gm.) in benzene (160 ml.) and bromotrichloro-methane (26 gm.) was irradiated as in Example 3. The solvents were removed in vacuo. The crude product was dissolved in acetone (60 ml.) and treated with Jones reagent (5 ml., 2 N) for 6 min. at room temperature. After working up as in Example 1, the desired product was isolated by chromatography on alumina (60 gm.) to give 0.358 gm., M.P. 172–5° (dec.), $\alpha_D + 179°$, $$\lambda_{max.}^{MeOH} \; 239 \; m\mu \; (\epsilon = 16,300)$$

*Analysis.*—Calcd. for $C_{23}H_{27}BrO_6$: C, 57.61; H, 5.07; O, 20.02%. Found: C, 57.83; H, 5.75; O, 20.10%.

*Example 6.—Use of $Br_2$ as source of bromine atoms (6β,19-oxido-cholestanol acetate)*

3α-acetoxy-5α-cholestan-6β-yl nitrite (0.476 gm.) in benzene (80 ml.) was irradiated with a 200-watt lamp for 30 min. in the presence of bromine (0.23 gm.). The solution was then washed with aqueous sodium thiosulphate and water. The solvents were removed and the crude product chromatographed on alumina (25 gm.). Elution with benzen/dichloro-methane gave the desired product (0.103 gm.), M.P. 112–5°, identical with an authentic specimen.

I claim:
1. A process for the preparation of a steroid bromohydrin containing the grouping

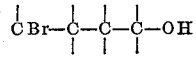

or upon elimination of hydrogen bromide, a steroid compound containing the grouping

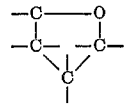

comprising reacting a nitrite ester of a steroid alcohol containing the grouping

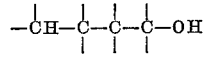

with free bromine radicals.

2. A process as claimed in claim 1 in which the free bromine radicals are furnished by cyanogen bromide, trichlorobromo methane, bromine, an N-bromoamide or an N-bromo-imide.

3. A process as claimed in claim 1 in which the reaction mixture is irradiated with ultraviolet radiation in the range 240–500 mµ.

4. A process as claimed in claim 3 in which the reaction mixture is irradiated with radiation from a mercury vapour lamp.

5. A process as claimed in claim 1 in which the reaction is effected in an inert solvent medium.

6. A process as claimed in claim 5 in which the solvent is a hydrocarbon or chlorinated hydrocarbon solvent.

7. A process as claimed in claim 6 in which the solvent is carbon tetrachloride, benzene or toluene.

8. A process as claimed in claim 1 in which a steroid bromohydrin is produced and dehydrobromination is effected by treatment of the bromohydrin reaction product with a hydroxide or carbonate of an alkali metal or alkaline earth metal or an organic nitrogen base.

9. A process as claimed in claim 8 in which the dehydrobromination is effected with sodium or potassium hydroxide in alkanolic solution.

10. A process as claimed in claim 1 in which the ester is a nitrite ester of a 6β-hydroxy or 11β-hydroxy steroid.

References Cited

UNITED STATES PATENTS 3,290,296   12/1966   Barton _____ 260—239.55

ELBERT L. ROBERTS, *Primary Examiner.*

HENRY FRENCH, *Examiner.*